(12) United States Patent
Ishida et al.

(10) Patent No.: US 7,354,068 B2
(45) Date of Patent: Apr. 8, 2008

(54) TILT STEERING COLUMN DEVICE FOR VEHICLE

(75) Inventors: Ryuuichi Ishida, Gunma-ken (JP); Shin Yoshimoto, Gunma-ken (JP); Masaki Tomaru, Gunma-ken (JP)

(73) Assignee: NSK Ltd., Tokyo (JP)

( * ) Notice: Subject to any disclaimer, the term of this patent is extended or adjusted under 35 U.S.C. 154(b) by 277 days.

(21) Appl. No.: 10/512,563

(22) PCT Filed: Jun. 2, 2003

(86) PCT No.: PCT/JP03/06924

§ 371 (c)(1),
(2), (4) Date: Oct. 25, 2004

(87) PCT Pub. No.: WO03/101806

PCT Pub. Date: Dec. 11, 2003

(65) Prior Publication Data
US 2005/0225068 A1    Oct. 13, 2005

(30) Foreign Application Priority Data
Jun. 4, 2002    (JP) ............................... 2002-163169

(51) Int. Cl.
*B62D 1/18*    (2006.01)
(52) U.S. Cl. ........................................ 280/775; 74/493
(58) Field of Classification Search .............. 280/775, 280/777, 779; 74/493
See application file for complete search history.

(56) References Cited

U.S. PATENT DOCUMENTS

| | | | |
|---|---|---|---|
| 4,495,834 A * | 1/1985 | Bauer et al. ................... | 74/493 |
| 5,199,319 A * | 4/1993 | Fujiu ............................ | 74/493 |
| 5,257,813 A * | 11/1993 | Snell ............................ | 280/775 |
| 5,596,907 A | 1/1997 | Barton | |
| 5,730,465 A * | 3/1998 | Barton et al. ................ | 280/775 |
| 5,743,150 A * | 4/1998 | Fevre et al. ................... | 74/493 |
| 5,845,936 A * | 12/1998 | Higashino .................... | 280/775 |

(Continued)

FOREIGN PATENT DOCUMENTS

DE    40 16 163    11/1991

(Continued)

*Primary Examiner*—Paul N. Dickson
*Assistant Examiner*—Joseph Rocca
(74) *Attorney, Agent, or Firm*—Miles & Stockbridge P.C.

(57) ABSTRACT

In a tilt and/or telescopic type steering column apparatus for a vehicle, in which a column sided bracket attached to a steering column is so provided as to be swingable about a car body sided bracket attached to a car body, the two brackets are press-fitted to each other by fastening a fastening bolt inserted through the two brackets and thus fastened in a tilt and/or telescopic adjustment position, while a tilt and/or telescopic adjustment can be made by releasing the two brackets from being press-fitted by slackening the fastening bolt, a balance or leap-up spring for biasing a pair of biasing end portions each other is provided, the one biasing end portion of the balance or leap-up spring is fitted to the car body or the car body sided bracket, and the other biasing end portion supports sad steering column or the column sided bracket, an improvement is characterized in that a slide member abutting on the steering column or the column sided bracket is attached to the other biasing end portion of the balance or leap-up spring.

5 Claims, 4 Drawing Sheets

U.S. PATENT DOCUMENTS

| | | | |
|---|---|---|---|
| 6,092,957 A * | 7/2000 | Fevre et al. | 403/373 |
| 6,183,012 B1 * | 2/2001 | Dufour et al. | 280/777 |
| 6,367,840 B1 * | 4/2002 | Duval et al. | 280/777 |
| 6,419,269 B1 * | 7/2002 | Manwaring et al. | 280/775 |
| 2002/0024208 A1 * | 2/2002 | Fujiu et al. | 280/775 |
| 2005/0166700 A1 | 8/2005 | Ishida et al. | |

FOREIGN PATENT DOCUMENTS

| | | |
|---|---|---|
| EP | 0706469 | 1/1995 |
| EP | 0834438 A1 | 4/1998 |
| GB | 2 113 629 | 8/1983 |
| JP | 55-51664 | 4/1980 |
| JP | UM 60-98571 | 7/1985 |
| JP | UM 62-64679 | 4/1987 |
| JP | 1-114476 U | 8/1989 |
| JP | 9-2294 A | 1/1997 |
| JP | 10-512825 A | 12/1998 |
| JP | 2000-16303 A | 1/2000 |
| JP | 2001-322552 A | 11/2001 |

* cited by examiner

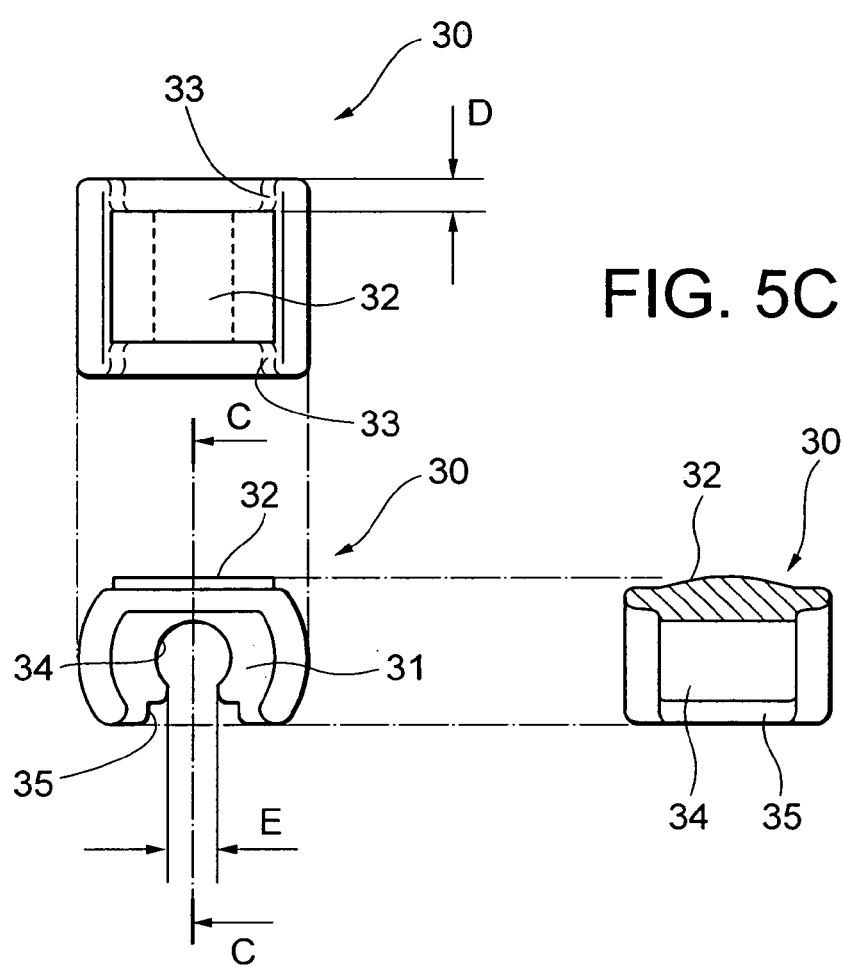

TILT STEERING COLUMN DEVICE FOR VEHICLE

TECHNICAL FIELD

The present invention relates to a tilt type steering column apparatus for a vehicle.

BACKGROUND ARTS

For example, in a tilt and/or telescopic type steering column apparatus for a vehicle, a steering column is so constructed as to be tiltable and/or telescopically slidable, and, when fastened in a tilt and/or telescopic adjustment position, a column sided bracket (distance bracket) attached to the steering column is held in a way that press-fits this bracket to a car body sided bracket (tilt bracket) attached to a car body by use of a clamp mechanism.

A balance spring for sustaining a steering column so as to raise the steering column in order to prevent the steering column from carelessly coming off when performing a tilt and/or telescopic adjustment. This balance spring includes, for instance, a pair of biasing end portions giving a bias in such directions that they expand each other. One biasing end portion is attached to the car body or the car body sided bracket, and the other biasing end portion sustains the steering column or the column sided bracket.

Further, recently there have increased demands for RVs (Recreational Vehicles), and the utilization of the vehicles has been diversified. For instance, family members have meals in a car room, the vehicle is employed as a substitute for a tent in camp, and so forth. A request on such occasions is that the steering column is retreated by leaping up the steering column at a large angle, a driver's seat is directed backward by turning, and a comparatively large effective utility space is formed over the driver's seat.

A leap-up spring is provided for leaping up the steering column and has the same construction as the balance spring has. The leap-up spring includes, for example, a pair of biasing end portions giving a bias in such directions that they expand each other, wherein one biasing end portion is attached to the car body or the car body sided bracket, and the other biasing end portion sustains the steering column or the column sided bracket.

Incidentally, in the balance or leap-up spring, as described above, the other biasing end portion abuts on the steering column or the column sided bracket.

When making the telescopic adjustment, the other biasing end portion slides on the abutting portion of the steering column or the column sided bracket, and therefore some sort of a spacer member is provided on the abutting portion in terms of improving the slidability as well as of muting noises caused by the slide.

The spacer member is, e.g., a plate-like spacer member. In this case, however, it is laborious to fit the plate-like spacer member.

Further, there is a case where the other biasing end portion of the balance or leap-up spring abuts on a fastening bolt for fixation in a tilt or telescopic position. In this case, the fastening bolt is covered with a tube on which the other biasing end portion abuts in terms of improving the slidability as well as of muting noises caused by the telescopic slide.

In this case, an operation of assembling in the fastening bolt must involve intruding the fasting bolt into the tube, thus requiring an unnecessary and laborious operation on the occasion of the assembly.

Moreover, as disclosed in UK Patent GB2113629A or DE4016163A1, the other biasing end portion of the balance or leap-up spring is brought into contact with the fastening bolt for the fixation in the tilt or telescopic position in terms of muting the noises caused when the telescopic slide is performed, and a pulley-like roller member with which the other biasing end portion is brought into contact, is rotatably fitted to the fastening bolt in order to improve the slidability.

In this case, however, a couple of pulley-like roller members are needed, and the number of roller members becomes large. Further, the roller members are constructed rotatably, and hence a working accuracy gets important, and an operation of guiding and fitting the other biasing end portion into a groove of the pulley-like roller member is laborious.

DISCLOSURE OF THE INVENTION

It is an object of the present invention, which was devised under the circumstances described above, to provide a tilt and/or telescopic type steering column apparatus for a vehicle, which facilitates assembling and attains both of a highly preferable mute level of noises caused when adjusting in a tilt and/or telescopic position and a highly preferable slidability.

To accomplish the above object, according to the present invention, in a tilt and/or telescopic type steering column apparatus for a vehicle, in which a column sided bracket attached to a steering column is provided swingably onto a car body sided bracket attached to a car body, the two brackets are press-fitted to each other by fastening a fastening bolt inserted through the two brackets and thus fastened in a tilt and/or telescopic adjustment position, while a tilt and/or telescopic adjustment can be made by releasing the two brackets from being press-fitted by slackening the fastening bolt, a balance or leap-up spring for biasing a pair of biasing end portions each other is provided, the one biasing end portion of the balance or leap-up spring is fitted to the car body or the car body sided bracket, and the other biasing end portion supports said steering column or the column sided bracket, an improvement is characterized in that a slide member abutting on the steering column or the column sided bracket is attached to the other biasing end portion of the balance or leap-up spring.

Further, in the tilt and/or telescopic type steering column apparatus for the vehicle according to the present invention, preferably the slide member is formed of a synthetic resin.

Still further, in the tilt and/or telescopic type steering column apparatus for the vehicle according to the present invention, preferably the slide member includes an accommodation holding portion that accommodates the other biasing end portion of the balance or leap-up spring through a crosswise expansion thereof resisting elastic returning force and holds the other biasing end portion through a crosswise reduction thereof by elastic returning force after the accommodation, and an abutting portion taking a curvilinearly protruded shape which abuts on the steering column or the column sided bracket. Thus, according to the present invention, the slide member is formed in a compact shape and can be built in by an extremely simple operation, thereby making it possible to remarkably improve a built-in property and to keep the slide member in a surely-attached state without coming off carelessly or easily. Besides, the noises caused by the slide can be muted, and slidability can be highly improved. Moreover, the improvement of the built-in property can facilitate posterior attaching of the slide member. Furthermore, the slide member is formed in the compact shape, thereby making it possible to bring about a decrease in cost.

BRIEF DESCRIPTION OF THE DRAWINGS

FIG. 5A is a plan view of a slide member; FIG. 5B is a side view of the slide member; FIG. 5C is a view taken along the line c-c in FIG. 5B.

EMBODIMENT OF THE INVENTION

An impact absorbing type and tilt and/or telescopic type steering column apparatus according to an embodiment of the present invention, will hereinafter be described with reference to the drawings.

Figure 1:
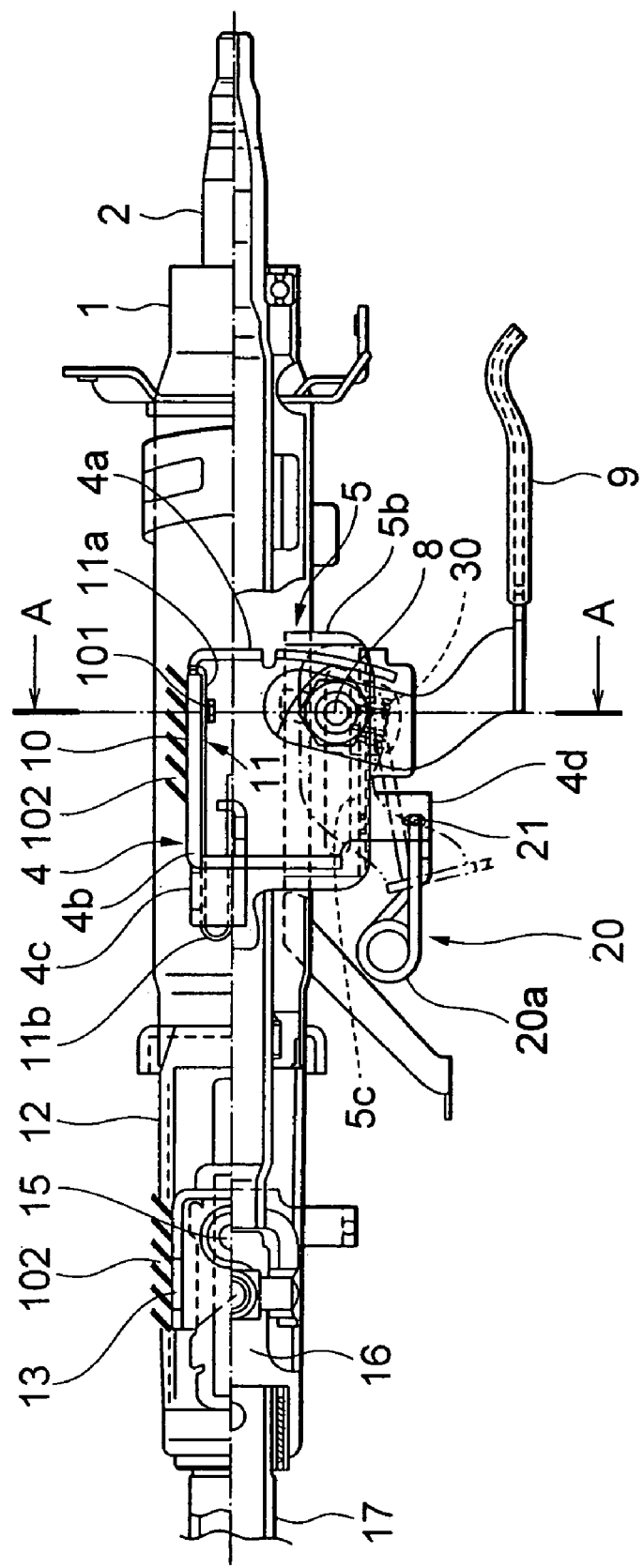
FIG. 1 is a partial sectional side view of an impact absorbing type and telescopic and/or telescopic type steering column apparatus according to an embodiment of the present invention.

As shown in FIG. 1, a steering shaft 2 is rotatably supported within a steering column 1. A steering wheel (unillustrated) is secured to an upper side end of the steering shaft 2.

The steering column 1 is fixedly supported onto a car body at two portions, i.e., an upper bracket provided on a rear side of the vehicle and a lower bracket provided on a front side thereof.

The upper bracket on the rear side of the vehicle is constructed of a car body sided upper bracket 4 (tilt bracket) fixed to the car body, and of a column sided upper bracket 5 (distance bracket in FIG. 2) fixed to the steering column 1, wherein the two upper brackets 4 and 5 are press-fitted to each other.

The car body sided upper bracket 4 includes U-shaped body sided plate portions 4a, 4a extending downward with the steering column 1 interposed therebetween, flange portions 4b, 4b extending crosswise on both sides from the body sided plate portions 4a, 4a and fixed to the car body by use of bolts 101, overhanging portions 4c, 4c overhanging substantially in a C-shape toward the front of the vehicle from the body sided plate portions 4a, 4a, and a suspended sustaining portion 4d suspended below at an interval from the body sided plate portions 4a, 4a.

Figure 4:
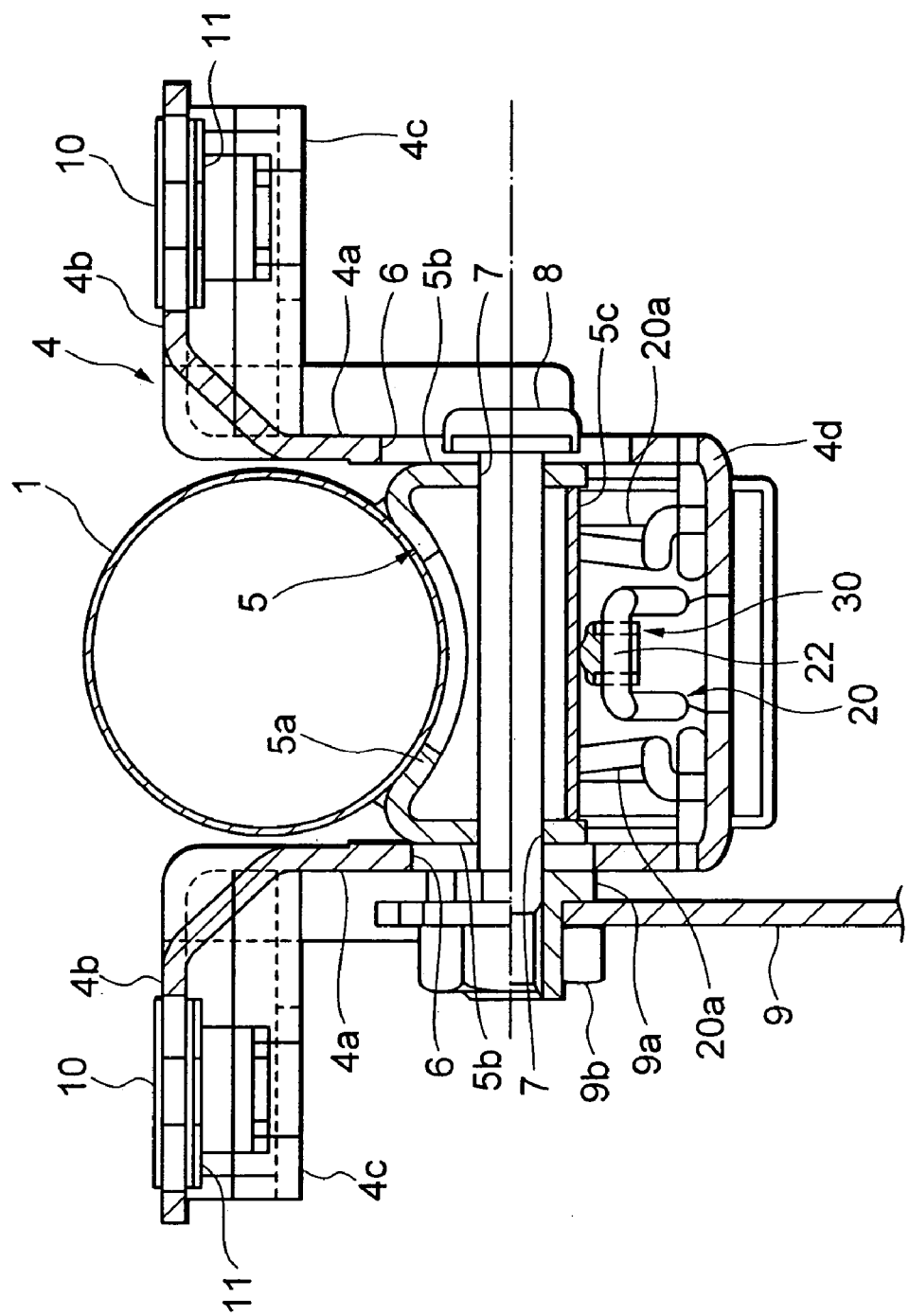
FIG. 4 is a sectional view taken along the line A-A in FIG. 1.

The column sided upper bracket 5 is constructed of, as illustrated in FIG. 4, a column support portion 5a abutting directly on a lower part of the steering column 1 and fixed thereto by welding, etc., bilateral plate portions 5b, 5b integral with the column support portion 5a, extending downward and pressure-contacted by between the body sided plate portions 4a, 4a of the car body sided upper bracket 4, and an insertion plate portion 5c inserted in between lower parts of the bilateral plate portions 5b, 5b.

Figure 2:
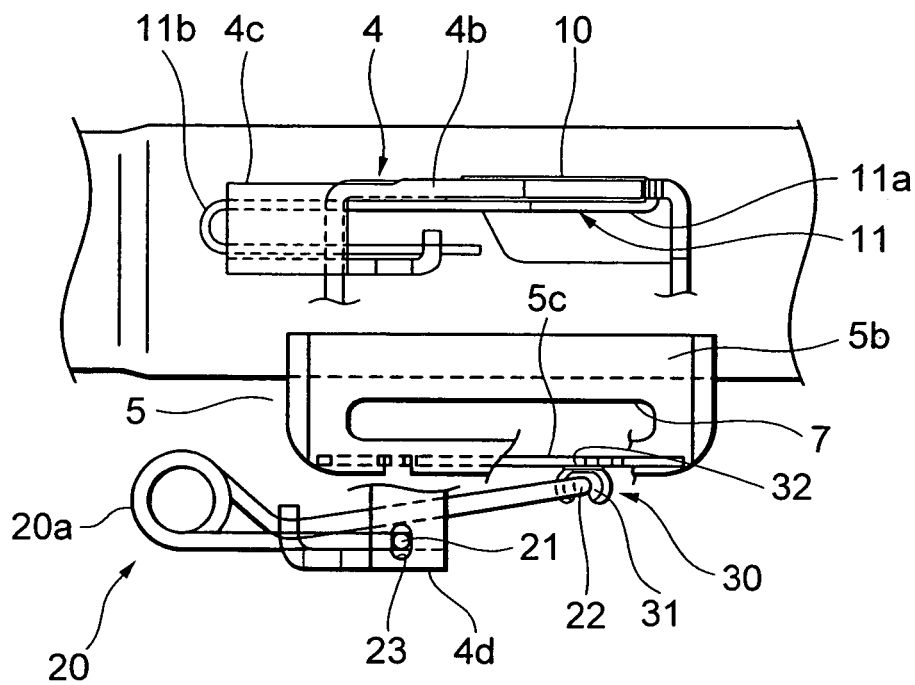
FIG. 2 is a side view of a car body sided upper bracket (tilt bracket) with some portions cut away from the steering column apparatus.

The car body sided upper bracket 4 is formed with tilt adjustment elongate holes 6, and the column sided upper bracket 5 is formed with telescopic adjustment elongate holes 7 (FIG. 2). A fastening bolt 8 is inserted through the tilt adjustment elongate holes 6 and the telescopic adjustment elongate holes 7. An operating lever 9 is secured to one side end of the tilt fastening bolt 8 by a fastening nut 9b via an adjustment nut 9a. These components build up a tilt and/or telescopic adjustment clamp mechanism.

Further, coating plates 10 each taking substantially a U-shape and impact absorbing plates 11 for absorbing impact energy when a secondary collision happens, are fixed by the bolts 101 (see FIG. 1) to a car body sided strengthening member 102, depicted by oblique lines in FIG. 1, at the flanges 4b of the car body sided upper bracket 4.

The impact absorbing plate 11 is fixed at its proximal side end 11a to the car body by the bolt 11. The impact absorbing plate 11 extends inside the substantially-C-shaped overhanging portion 4c of the car body sided upper bracket 4 toward the front of the vehicle, and, after being bent at a circular-arc portion 11b, extends inside the overhanging portion 4c toward the rear of the vehicle.

Upon the secondary collision, the impact energy acting toward the front of the vehicle gives momentum to the car body sided upper bracket 4, with the result that the upper bracket 4 separates from the coating plate 10 and moves together with the steering column 1 toward the front of the vehicle.

At this moment, the impact absorbing plate 11, the proximal side end 11a being fixed to the car body by the bolt 11, remains on the car body side. On the other hand, the circular-arc portion 11b, etc. is subjected to a plastic deformation (drawn) within the substantially-C-shaped overhanging portion 4c of the car body sided upper bracket 4 that moves toward the front of the vehicle. The plastic deformation (drawing) of the impact absorbing plate 11 makes it possible to absorb the impact energy of the secondary collision. Those components configure an impact absorption mechanism.

The lower bracket on the front side of the vehicle is constructed of a column sided lower bracket 12 fixed to the steering column 1 and of a car body sided lower bracket 13 press-fitted to the lower bracket 12 and fixed to the car body sided strengthening member 102.

The column sided lower bracket 12 is formed with axially elongate holes (unillustrated) extending in axial directions. A support pin 15 is inserted through the axially elongate holes (not shown) formed in the column sided lower bracket 12 and the car body sided lower bracket 13, and these lower brackets are fixed to each other by caulking.

Further, an intermediate shaft 17 is connected via a universal joint 16 to a vehicle-front-sided portion of the steering shaft 2.

Provided in the present embodiment is a balance spring 20 for sustaining the steering column 1 so as to raise the steering column 1 in order to prevent the steering column 1 from carelessly coming off when performing the tilt and/or telescopic adjustment.

Figure 3:
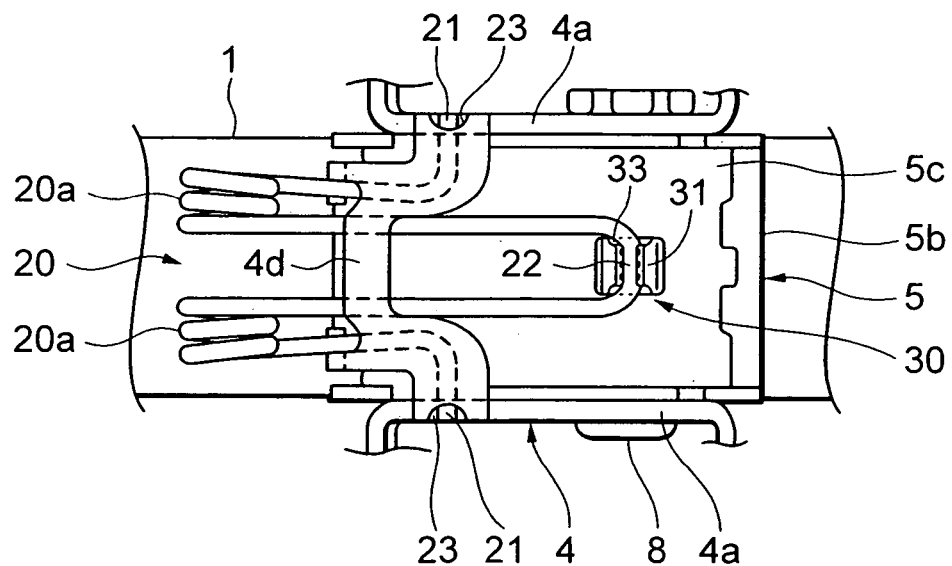
FIG. 3 is a bottom view of the steering column apparatus shown in FIG. 1.

The balance spring 20 includes, as shown in FIGS. 2 and 3, for example, a coil spring and includes a couple of coil body portions 20a, 20a, a pair of cut-off ends 21, 21 and a fold-back portion 22 folded back between the coil body portions 20a and 20a.

The pair of cut-off ends 21, 21 and the fold-back portion 22 cooperate to configure a pair of biasing end portions biased in such directions that they expand each other.

One biasing end portions 21, 21 (the cut-off ends) engage with engagement holes 23, 23 formed in the suspended sustaining portion 4d of the car body sided upper bracket 4.

The other biasing end portion 22 (the fold-back portion) is fitted with a slide member 30 and sustains the column sided upper bracket 5 so that the upper bracket 5 is directed upward when performing the tilt and/or telescopic operation.

Provided further is a leap-up spring for leaping up the steering column 1 in the case of retreating the steering column 2 by leaping up the column 1 at a large angle. This leap-up spring has substantially the same configuration as the balance spring 20 has. Note that for leaping up the steering column 1, the operating lever 9 is operated up to a leap-up position after being released from the tilt and/or telescopic position by operating the operating lever 9, whereby the steering column 1 is leaped up by dint of biasing force of the leap-up spring.

The slide member 30 is formed of, as shown in FIGS. 5A through 5C, a synthetic resin substantially in a C-shape. The slide member 30 has a clip body portion 31 (an accommodation holding portion) that accommodates the other biasing end portion 22 (the fold-back portion) of the spring 20 through a crosswise expansion thereof resisting elastic returning force (clipping force) and holds the other biasing end portion 22 (the fold-back portion) through a crosswise reduction thereof by the elastic returning force (the clipping force), an abutting portion 32 taking a curvilinearly protruded shape which abuts on the column sided bracket 5, and guide portions 33, 33 for guiding the other biasing end portion 22 (the fold-back portion) of the spring 20.

As shown in FIG. 5B, the clip body portion 31 is formed with a circular-arc portion 34 corresponding to a thickness of a wire of the other biasing end portion 22 of the spring 20, and a guide portion 35 for guiding the wire into the circular-arc portion 34 is formed thereunder. An entrance dimension (E) of the circular-arc portion 34 is set slightly narrower than a wire diameter of the spring 20.

As shown in FIG. 5A, each of the guide portions 33, 33 is formed in a circular-arc and has an overhang (D) more extending than a width of the clip body portion 31. This contrivance prevents the clip body portion 31 from deviating toward the coil body portions 20a from the biasing end portion 22 (the fold-back portion) of the spring 20 when attaching the other biasing end portion 22 (the fold-back portion) of the coil spring to the clip body portion 31.

As shown in FIG. 5C, the abutting portion 32 is formed in the curvilinearly protruded shape having a ridgeline that is gentle in crosswise directions of the vehicle. With this configuration, even when the slide member 30 gets inclined, the abutting portion 32 can abut thereon substantially at the center, whereby more stable slide performance can be acquired.

The construction being thus made, according to the present embodiment, when effecting the telescopic adjustment, the slide member 30 can slide along the insertion plate portion 5c of the column sided upper bracket 5.

The slide member 30 is thus formed in a compact shape and can be attached by the elastic clipping force, whereby the assembly can be done by an extremely simple operation and the built-in property can be remarkably improved.

Moreover, the slide member 30 can be held by the elastic clipping force and can therefore, after being built in, remain surely attached without coming off carelessly or easily.

Further, when slide member 30 slides on the column sided bracket 5, noises caused by the slide can be muted, and the slidability can be highly improved.

Still further, the improvement of the built-in property can facilitate posterior attaching of the slide member 30.

Yet further, as the slide member 30 is formed of the synthetic resin in the compact shape, thereby making it possible to bring about a decrease in cost.

It should be noted that the present invention can be modified in a variety of forms without being limited to the embodiment discussed above.

As discussed above, according to the present invention, the slide member is formed in the compact shape and can be built in by the extremely simple operation, thereby making it possible to remarkably improve the built-in property and to keep the slide member in the surely-attached state without coming off carelessly or easily. Besides, the noises caused by the slide can be muted, and the slidability can be highly improved. Moreover, the improvement of the built-in property can facilitate the posterior attaching of the slide member. Furthermore, the slide member is formed in the compact shape, thereby making it possible to bring about the decrease in cost.

What is claimed is:

1. In a tilt and/or telescopic steering column apparatus for a vehicle, in which a column side bracket attached to a steering column is so provided as to be swingable relative to a vehicle body side bracket attached to a vehicle body, said two brackets are fixed relative to each other with pressure by fastening a clamp mechanism and thus fastened in a tilt and/or telescopic adjustment position, while a tilt and/or telescopic adjustment can be made by releasing said two brackets from being fastened by said clamp mechanism, a biasing spring having a pair of biasing end portions is so provided that one of said biasing end portions is attached to the vehicle body or said vehicle body side bracket, and the other of said biasing end portions supports said steering column or said column side bracket, thereby biasing said steering column in an upward direction, an improvement characterized in that a slide member slidably abutting on said steering column or said column side bracket is attached to said other biasing end portion of said spring such that said steering column is upwardly biased by said abutting slide member and, during a tilt and/or telescopic adjustment, said slide member slides relative to said steering column or said column side bracket along an axial direction of said steering column.

2. A tilt and/or telescopic steering column apparatus for a vehicle according to claim 1, wherein said slide member is formed of a synthetic resin.

3. A tilt and/or telescopic steering column apparatus for a vehicle according to claim 1, wherein said slide member is rotatably attached to said other biasing end portion of said spring.

4. A tilt and/or telescopic steering column apparatus for a vehicle according to claim 3, wherein said slide member is elastically clipped to said other biasing end portion of said spring.

5. A tilt and/or telescopic steering column apparatus for a vehicle according to claim 1, wherein said slide member includes an abutting portion having a curvilinearly protruded shape which abuts on said steering column or said column side bracket.

* * * * *